(12) United States Patent
Redecker

(10) Patent No.: US 7,726,614 B2
(45) Date of Patent: Jun. 1, 2010

(54) CLAMP-TYPE HOLDER

(75) Inventor: Robert Redecker, Hamburg (DE)

(73) Assignee: Airbus Deutschland GmbH (DE)

(*) Notice: Subject to any disclaimer, the term of this patent is extended or adjusted under 35 U.S.C. 154(b) by 132 days.

(21) Appl. No.: 11/885,829

(22) PCT Filed: Mar. 15, 2006

(86) PCT No.: PCT/EP2006/002375

§ 371 (c)(1),
(2), (4) Date: Aug. 29, 2007

(87) PCT Pub. No.: WO2006/097291

PCT Pub. Date: Sep. 21, 2006

(65) Prior Publication Data

US 2008/0121769 A1    May 29, 2008

Related U.S. Application Data

(60) Provisional application No. 60/663,024, filed on Mar. 18, 2005.

(30) Foreign Application Priority Data

Mar. 18, 2005    (DE)    ........................ 10 2005 012 610

(51) Int. Cl.
F16B 2/06    (2006.01)
(52) U.S. Cl. ............. 248/220.21; 248/674; 248/222.14; 60/796

(58) Field of Classification Search .............. 248/220.2, 248/231.4, 224.2, 231.6
See application file for complete search history.

(56) References Cited

U.S. PATENT DOCUMENTS

| 2,893,676 | A | * | 7/1959 | Connors et al. | ........ 248/222.14 |
| 4,477,047 | A | * | 10/1984 | Pelczarski | .................... 248/201 |
| 5,186,570 | A | * | 2/1993 | Graf | ........................... 403/174 |
| 5,435,124 | A | * | 7/1995 | Sadil et al. | .................... 60/796 |
| D432,842 | S | * | 10/2000 | Gastelum et al. | ............. D6/549 |
| D432,843 | S | * | 10/2000 | Gastelum et al. | ............. D6/549 |
| 2008/0121769 | A1 | * | 5/2008 | Redecker | ............... 248/220.21 |

FOREIGN PATENT DOCUMENTS

| DE | 43 28 106 C1 | 2/1995 |
| DE | 196 26 852 A1 | 1/1998 |
| FR | 2 602 838 A | 2/1988 |
| FR | 2602838 A1 * | 2/1988 |

* cited by examiner

Primary Examiner—J. Allen Shriver, II
Assistant Examiner—Alaeddin Mohseni
(74) Attorney, Agent, or Firm—Lerner, David, Littenberg, Krumholz & Mentlik, LLP

(57) ABSTRACT

The present invention relates to a clamp-type holder (1) and a clamp-type holder element (2) for it, wherein the clamp-type holder element (2) comprises a mouth-shaped clamping region (5) and a holding region (6) for the attachment of a component, wherein the clamp-type holder system (1) comprises two clamp-type holder elements (2) that are interconnected by way of a connecting device (9) in order to be able to be clamped to profile beams (3) of different thicknesses.

10 Claims, 4 Drawing Sheets

CLAMP-TYPE HOLDER

REFERENCE TO RELATED APPLICATIONS

This application claims the benefit of the filing date of German Patent Application No. 10 2005 012 610.3 filed Mar. 18, 2005 and of U.S. Provisional Patent Application No. 60/663,024 filed Mar. 18, 2005, the disclosure of which applications is hereby incorporated herein by reference.

FIELD OF THE INVENTION

The invention relates to a clamp-type holder system and a clamp-type holder element for such a clamp-type holder system, in particular for use in aircraft construction.

TECHNOLOGICAL BACKGROUND

Generally speaking, in aircraft construction, holders are used in order to attach various devices to the primary structure of an aircraft. These holders are structural elements that provide mechanical interfaces to the primary structure and to system holders.

However, in order to meet various system installation requirements, it is often necessary to use various types of holders. For example there are holders that are firmly attached to an aircraft structure by means of rivets, screw connections or bonding. Such holders are inflexible in relation to various installation conditions, which might be disadvantageous especially during the development phase of aircraft prototypes.

Another type of holder that may be used in aircraft construction is an clamp-type holder which by means of clamping force and friction makes it possible to attach components to an aircraft structure.

However, this type of holder needs to be specially matched to the profile beam to which the holder is to be clamped. Profile beams of different diameters (thicknesses) therefore require different clamping holders that match the profile thickness.

SUMMARY OF THE INVENTION

Amongst other things, it may be an object of the present invention to create a clamp-type holder element and a clamp-type holder system comprising such a clamp-type holder element, wherein flexible use in a host of different installation conditions is possible.

This object may be met as set out in the independent claims. Further developments of the invention are stated in the subordinate claims.

A clamp-type holder element according to the invention comprises a base body which at one of its ends comprises a mouth-shaped clamping region and on its other end comprises a holding region. The holding region is configured and used for attachment of a component. Below the clamping region of the clamp-type holder element there is a through-borehole that extends to the holding region and that passes through the base body.

The mouth-shaped clamping region serves to accommodate a clamping region of a profile beam, for example a T-profile beam, to which the clamp-type holder element is to be clamped. The clamp-type holder element is preferably used in a clamp-type holder system that comprises a pair of clamp-type holder elements that are connected by way of a connecting device that extends through the respective through-boreholes in the clamp-type holder elements when the clamp-type holder elements are clamped to opposite sides of the profile beam.

An opening of the mouth-shaped clamping region matches the thickness of the profile beam or it matches a profile thickness range.

According to another embodiment of the invention the longitudinal axis of the through-borehole, which extends below the clamping region of the clamp-type holder element, is arranged at a predefined angle at an incline in relation to the clamping region. In this way it may be possible to use a mouth-shaped clamping region, which comprises a particular opening, for profile beams of different thicknesses because, during clamping of the clamp-type holder elements from opposite sides to the profile beam, the connecting device, which for example comprises a screw and a nut and which is inserted into the through-boreholes of the clamp-type holder elements, in the regions of the respective through-boreholes is elastically bent towards the outside. This elastic bending of the connecting device compensates for the tilting moment that acts on the clamp-type holder element, which tilting moment results from the clamping force of the connecting device, which clamping force acts in different planes, and which tilting moment also results from the reaction force of the profile beam. The clamping force that is generated by the connecting device results during tensioning of the device (tightening of the nut) to a lesser extent by axial elongation at high rigidity, and to a greater extent by elastic deformation of the device at comparatively low flexural strength. In this way favourable distribution of the tension in the clamp-type holder elements is achieved, as a result of which in the case of creeping thermoplastic materials (e.g. PA 6.6 GF 35%) prolonged maintenance of the clamping force may be ensured. By bending the connecting device, a spring force is exerted on the clamp-type holder elements, as a result of which the respective clamping holder elements are firmly clamped to the profile beam.

According to yet another exemplary embodiment of the invention, the clamp-type holder element according to the invention comprises a recess in the holding region for accommodating an insert to which a component can be attached. The recess may be for example conical in shape so as to accommodate a corresponding conical end of the insert. Such accommodation can take place by a press-fitting which, for example, can be additionally screwed to the base body of the clamp-type holder element.

Consequently, in the clamped-on state of the clamp-type holder element, the insert is flexibly exchangeable for some other insert. Furthermore, the insert can be positioned (rotated) as desired in the recess. Furthermore, the insert extends, for example, essentially along the longitudinal axis of the recess, perpendicular to the clamping region.

SHORT DESCRIPTION OF THE DRAWINGS

Below, the invention is described with reference to the enclosed drawings by means of a exemplary embodiment.

In the drawings.

Below, in the various views of the figures the same reference characters are used for identical components.

DETAILED DESCRIPTION OF EXEMPLARY EMBODIMENTS

Figure 1:
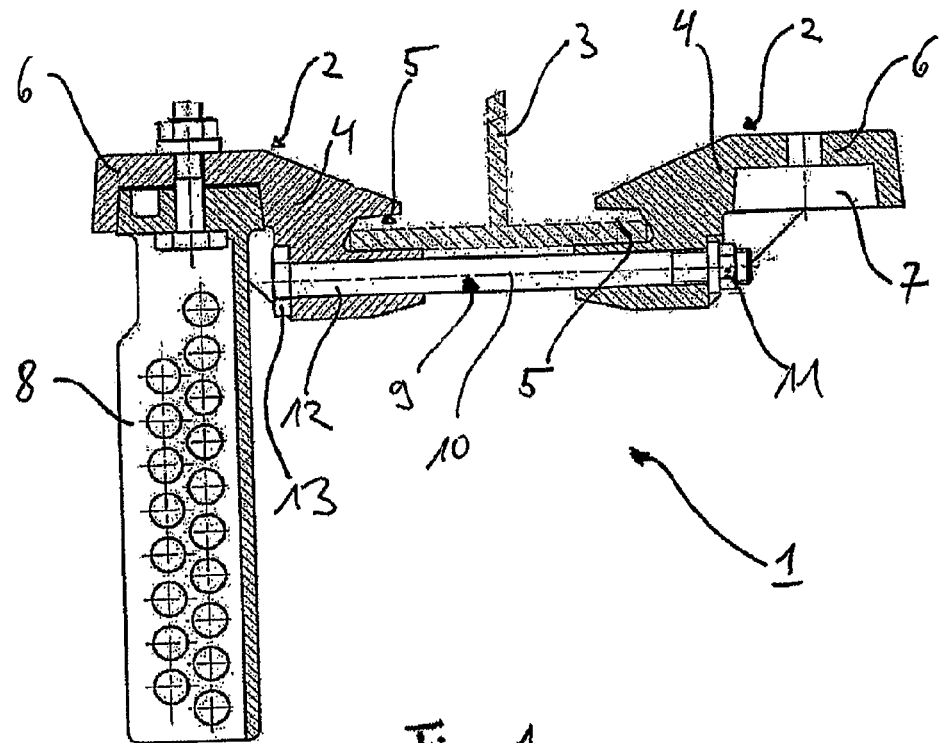
FIG. 1 shows a diagrammatic cross-sectional view of a clamp-type holder system according to a exemplary embodiment.

FIG. 1 shows a schematic cross-sectional view of a clamp-type holder system 1 according to a preferred embodiment. The clamp-type holder system 1 comprises two identically designed clamp-type holder elements 2, which are clamped from opposite sides to a T-profile beam, for example. The clamp-type holder element 2 comprises a base body 4, which at one of its ends comprises a mouth-shaped clamping region 5 and on its other end a holding region 6.

The clamp-type holder element 2 is for example made in a single piece from PA 6.6 GF 35%; however, it can be made from some other suitable material and from separately made components that are interconnected.

The holding region 6 comprises a recess 7 that is designed to accommodate an insert 8, to which any desired component can be attached, for example.

FIG. 1 shows the left-hand clamp-type holder element 2 with an insert 8 that has been inserted into the recess 7. Although in FIG. 1 the right-hand clamp-type holder element 2 is shown without an insert 8 inserted, the right-hand clamp-type holder element 2, can comprise an insert 8 inserted into the recess 7 as well.

The holding region 6 of the clamp-type holder element 2 will be explained in detail below with reference to FIG. 3.

As is also shown in FIG. 1, in the clamped state the clamp-type holder elements 2 are interconnected by a connecting device 9. The connecting device 9, which for example comprises a screw 10 and a nut 11, reaches through through-boreholes 12, each of which extends underneath the clamping regions 5 of the clamp-type holder elements 2. In order to clamp the clamp-type holder elements 2 to the T-profile beam, the screw 10 is inserted through both through-boreholes 12 of the clamp-type holder elements 2, wherein a screw head 13 formed on one end of the screw 10 abuts the base body 4 of the clamp-type holder element 2, while the other end of the screw 12 comprises a thread (not shown) onto which the nut 11 is screwed so as to firmly clamp the clamp-type holder elements 2 to the T-profile beam 3. This state will be described below with reference to FIG. 6.

Figure 2:
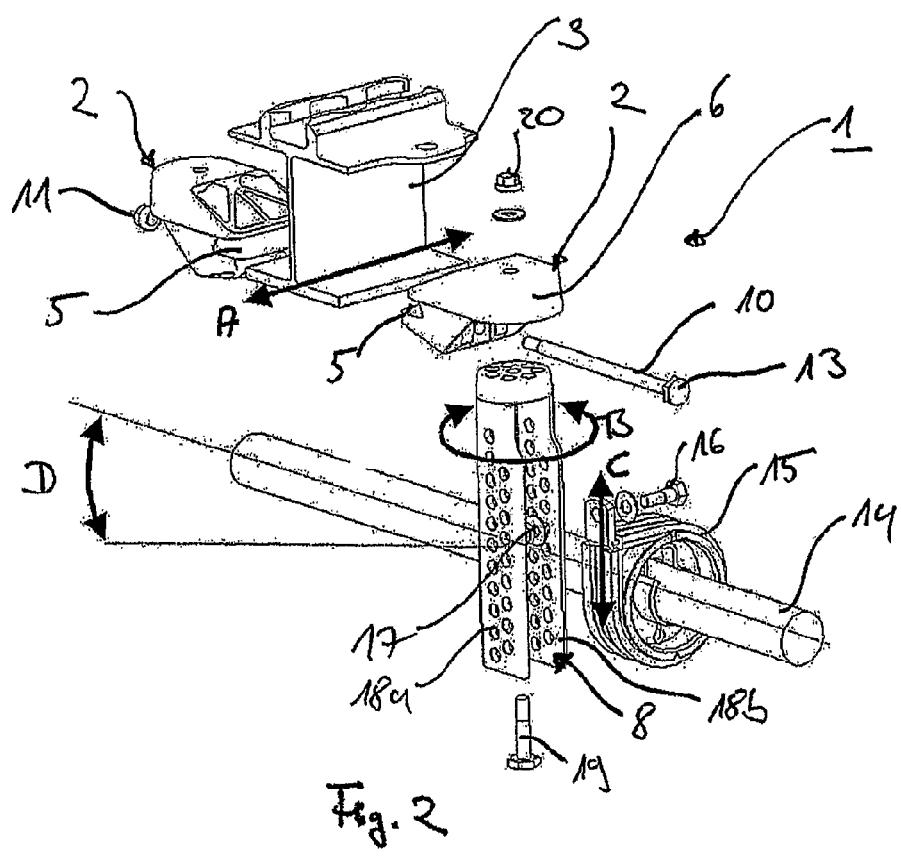
FIG. 2 shows a perspective exploded view of the clamp-type holder system shown in FIG. 1 with a component to be attached.

FIG. 2 shows a perspective exploded view of the clamp-type holder system 1 shown in FIG. 1. As shown in FIG. 2 the clamping regions 5 of the clamp-type holder elements 2 can be clamped to any desired position of a T-profile beam 3 (only partially shown in FIG. 2), as indicated by arrow A.

In relation to its longitudinal axis the insert 8 can be rotated as desired, as indicated by arrow B, and can be inserted in the holding region 6 of the clamp-type holder element 2. The insert 8 will be described in detail later with reference to FIG. 4.

As shown in FIG. 2, by way of an attachment device 15, a guide component 14 is attached to the insert 8 by means of a screw 16 and a nut 17. Since the sidewalls 18a, b of the insert 8 comprise a plurality of openings through which the screw 16 can be placed, the attachment device 15 can be attached at any desired position in horizontal direction, as indicated by arrow C, to the insert 8.

Furthermore, the guide component 14 guided through the attachment device 15 can be swivelled at any desired angle, as indicated by arrow D, relative to the T-profile beam 3.

As shown in FIG. 2 the insert 8 is inserted from below into the recess 7 of the holding region 6 of the clamp-type holder element 2 and is screwed to the clamp-type holder element 2 by means of a screw 19 and a nut 20. Other attachment techniques can be used.

Figure 3:
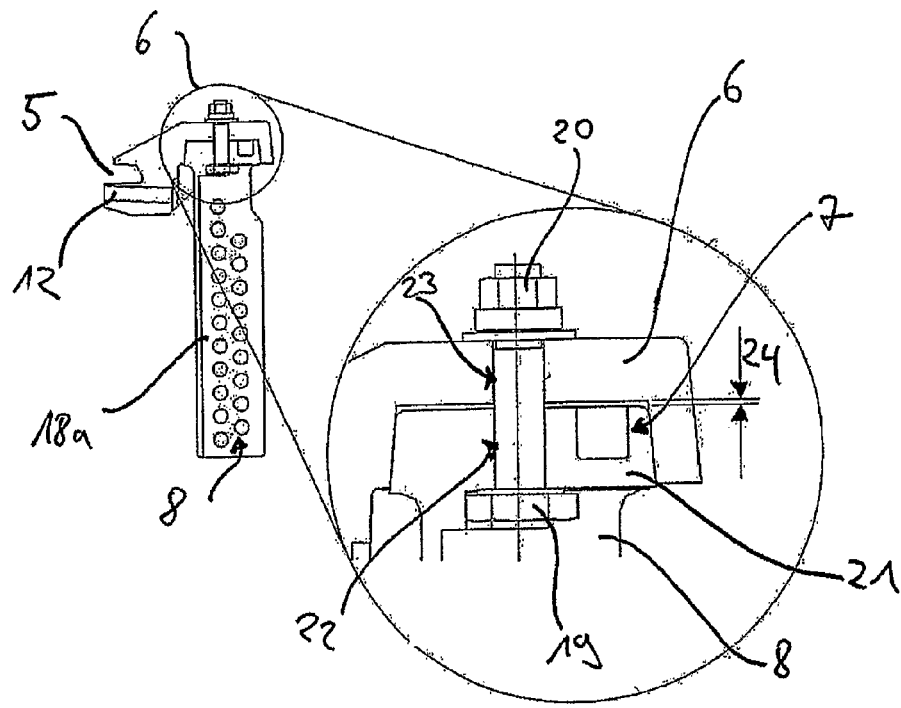
FIG. 3 shows a detailed diagrammatic view of the holding region of a clamp-type holder element in the clamp-type holder system according to FIG. 1.

FIG. 3 shows a schematic detailed view of the holding region 6 of the clamp-type holder element 2 which may be used in the clamp-type holder system according to FIGS. 1 and 2.

As shown in FIG. 3, the recess 7 of the holding region 6 is for example conical in shape and is used to accommodate a corresponding conical end 21 of the insert 8.

A through-borehole 22 extends through the end region 21 of the insert 8, wherein the screw 19 reaches through the through-borehole 22. Furthermore, the screw 19 extends through a through-borehole 23 in the holding region 6 so that, in order to attach the insert 8 to the holding region 6, the nut 20 can be screwed onto the end of the screw 19, which end projects through the through-borehole 23 of the holding region 6. FIG. 3 shows a state in which the insert 8 has not yet been completely inserted into the recess 7 of the holding region 6 and has not yet been affixed, i.e. the nut 20 has not yet been completely tightened, so that between the top surface of the end region 21 of the insert 8 and the inner surface of the recess 7 a gap 24 is formed. This gap 24 no longer exists after the nut 20 has been firmly tightened.

Figure 4:
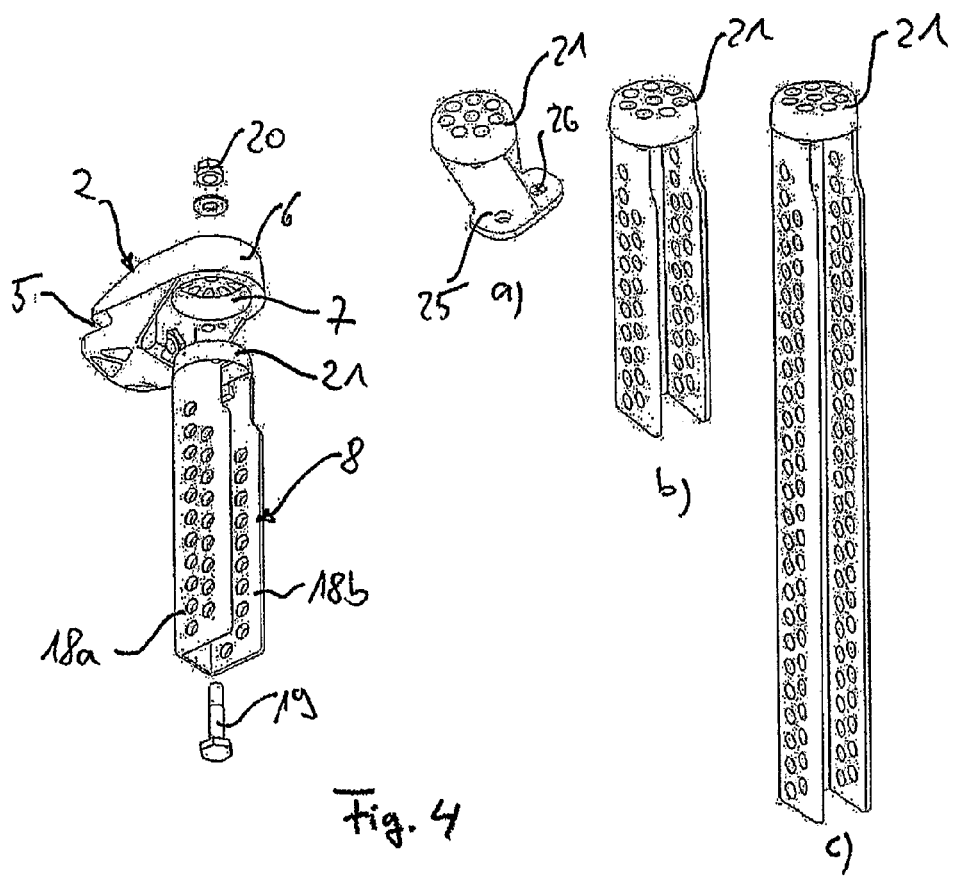
FIG. 4 shows a perspective view of various inserts for the holding region according to FIG. 3.

FIG. 4 shows a perspective view of three different inserts a)-c) as insert 8. As shown in FIG. 4 the inserts a)-c) according to exemplary embodiments each comprises a conical end region 21, which is inserted in the correspondingly conically shaped recess 7 of the holding region 6 of the clamp-type holder element 2 and is affixed to the holding region 6 of the clamp-type holder element 2 by means of the screw 19 and the nut 20.

The insert a) shown in FIG. 4, for example on an end that is opposite the end region 21, comprises a flange region 25, to which, for example by way of boreholes 26, a structural component can be attached.

Furthermore, the insert a) shown in FIG. 4 is for example designed such that the flange region 25 is arranged so as to be offset in relation to an essentially perpendicular longitudinal axis of the end region 21.

According to inserts b) and c), sidewalls 18a, 18b of the inserts, which comprise different lengths and a different number of holes for attaching a component, extend away from the end region 21.

The sidewalls 18a and 18b, shown in FIG. 4, of the inserts b) and c), extend essentially in a straight line away from the end region 21 of the insert; however, corresponding to the application they can also extend at a particular angle from the end 21.

The inserts shown in FIG. 4 are for example made from the same material as the clamp-type holder element 2.

Figure 5:
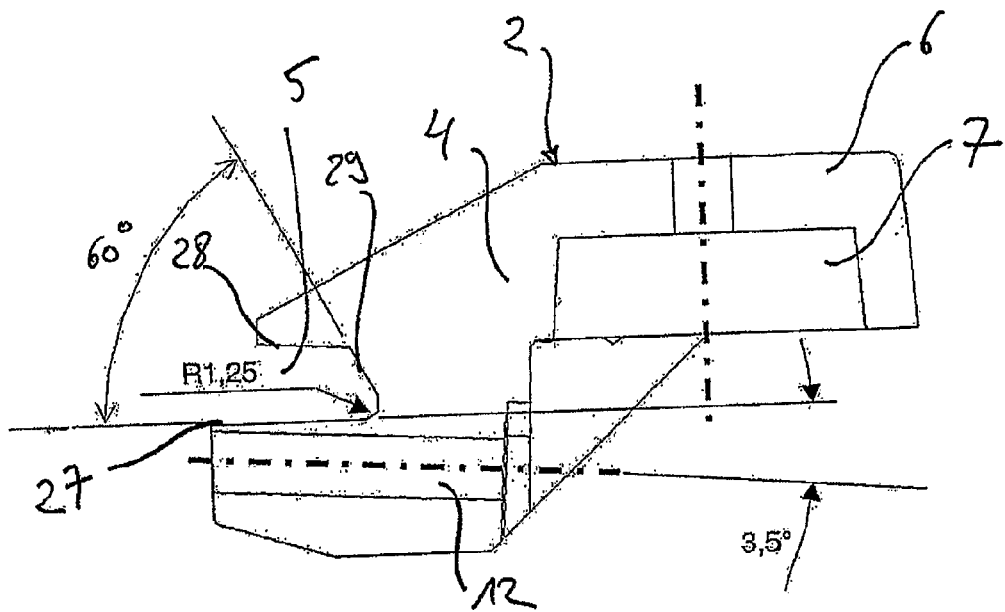
FIG. 5 shows a diagrammatic lateral cross-sectional view of the clamp-type holder element used in the clamp-type holder system according to FIG. 1.

FIG. 5 shows a schematic cross-sectional view of the clamp-type holder element 2 used in the clamp-type holder system according to FIG. 1.

As shown in FIG. 5, the clamping region 5 comprises a bottom clamping surface 27 and a top clamping surface 28. The bottom clamping surface 27 and the top clamping surface 28 are interconnected by way of a connection surface 29. The bottom clamping surface 27 and the top clamping surface 28 extend essentially parallel in relation to each other, wherein according to the preferred embodiment the bottom clamping surface 27 is longer than the top clamping surface 28.

According to the preferred embodiment the connection surface 29 extends at a predefined angle (for example 60°), inclined in relation to the bottom clamping surface 27, from said bottom clamping surface 27 to the top clamping surface 28. In this way a wedge effect is achieved when the clamp-type holder element is clamped to a profile beam, as will be described in more detail below.

As shown in FIG. 5, the through-borehole 12 below the clamping region 5 is inclined in relation to the plane in which the bottom clamping surface 27 is situated. According to the preferred embodiment, the plane in which the bottom clamping surface 27 is situated forms an angle of approximately 3.5° with the longitudinal axis of the through-borehole 12. Other inclinations of the through-borehole 12 relative to the clamping region 5 can be selected, depending on the area of application.

FIG. 5 shows a state in which no screw 10 is inserted in the through-borehole 12 of the clamp-type holder element 2.

As shown in FIG. 5, according to the preferred embodiment, a central longitudinal axis of the recess 7 essentially forms a right angle with the plane in which the bottom clamping surface 27 is situated.

Figure 6:
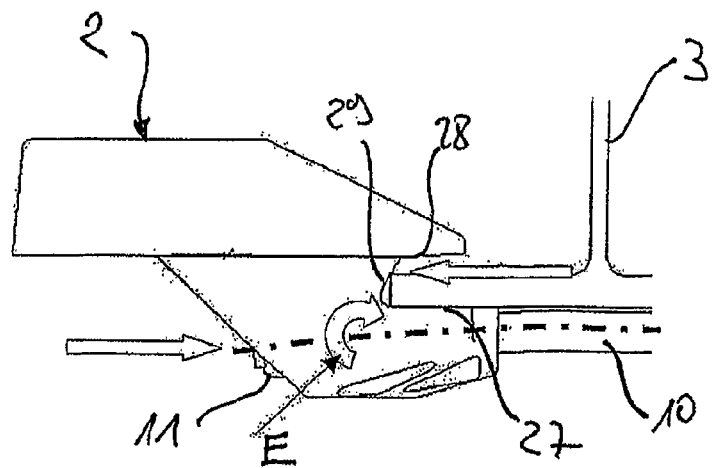
FIG. 6 shows a diagrammatic cross-sectional view of the clamp-type holder element shown in FIG. 5 in a clamped-on state.

FIG. 6 shows a diagrammatic cross-sectional view of the clamp-type holder element 2 shown in FIG. 5, in a clamped position.

As shown in FIG. 6, a T-profile beam 3 is inserted in the mouth-shaped clamping region 5 of the clamp-type holder element 2, wherein said mouth-shaped clamping region 5 contacts the bottom clamping surface 27 and the connection surface 29.

As shown in FIG. 6, the screw 10 has been inserted in the through-borehole 12, and is connected to a second clamp-type holder element 2 (not shown) that is clamped to the opposite side of the T-profile beam 3. By tightening the nut 11 the clamp-type holder element 2 is firmly clamped to the T-profile beam 3, wherein, due to the inclined design of the through-borehole 12 in relation to the bottom clamping surface 27, as has been described above, bending of the screw 10 in the region of the through-borehole 12 occurs, as indicated by the dashed line in FIG. 6. Consequently, the screw 10 acts as a spring element and exerts a spring force. As indicated by arrow E, a moment of torsion is generated by the elastically bent screw 10, which moment of torsion contributes to clamping the clamp-type holder element 2 firmly to the T-profile beam 3, although a distance between the bottom clamping surface 27 and the top clamping surface 28 of the clamping region 5 exceeds the thickness of that part of the profile beam 3, which part has been inserted in the clamping region 5. As a result of this, for example, thicknesses between 2 mm and 6 mm can be clamped with one and the same clamp-type holder element (clamp-type holder system).

Figure 7:
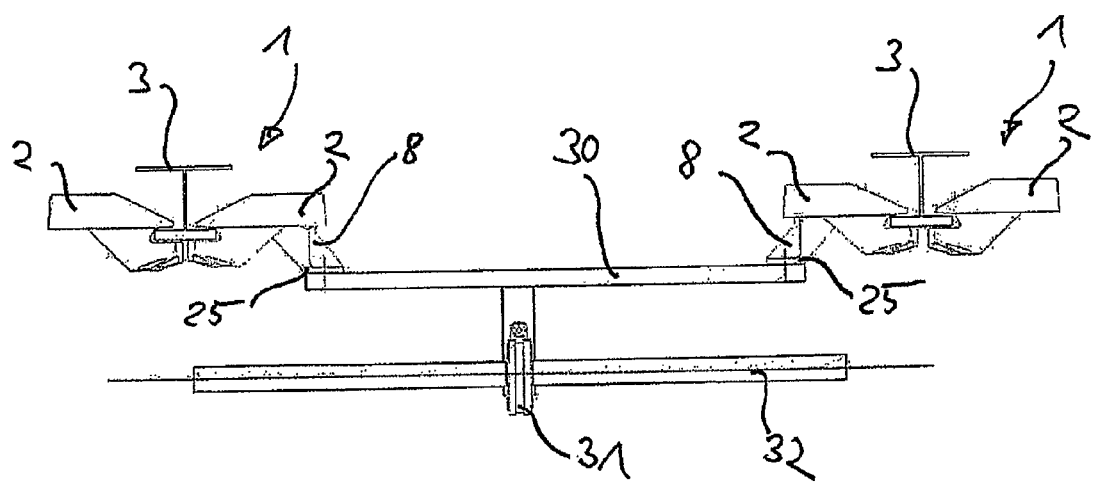
FIG. 7 shows a typical application of a clamp-type holder system according to the exemplary embodiment.

FIG. 7 shows an example of a typical use of a clamp-type holder system according to the invention.

FIG. 7 shows two clamp-type holder systems 1, each comprising two clamp-type holder elements 2 that are clamped to respective T-profile beams 3. As shown in FIG. 7, in the right-hand clamp-type holder element 2 of the clamp-type holder system 1 on the left-hand side of the figure, and in the left-hand clamp-type holder element 2 of the clamp-type holder system 1 on the right-hand side of the figure, inserts 8 have been inserted and attached to the holding regions 6 of the clamp-type holder elements 2, as described above. According to the example shown in FIG. 7 the inserts 8 for example correspond to the insert a) shown in FIG. 4.

For example, a connecting rod 30 is attached to the flange regions 25 of the inserts 8, for example by screwing, bonding, welding or by means of some other connection techniques.

As shown in FIG. 7, an attachment device 31 is attached to the connecting rod 30, wherein said attachment device 31 corresponds, for example, to the attachment device 15 shown in FIG. 2. The attachment device 31 for example accommodates a guide component 32, which according to the preferred embodiment corresponds to the guide component 14 shown in FIG. 2.

Although the invention has been described above in detail with reference to one preferred exemplary embodiment, it goes without saying that modifications and changes can be made without leaving the scope of the invention. The clamp-type holder system according to the invention and the clamp-type holder element respectively, can not only be used in aircraft construction but for example can also be used in shipbuilding or in other areas of application in which flexible attachment of components to a structure is required.

REFERENCE LIST

1 Clamp-type holder system
2 Clamp-type holder element
3 T-profile beam
4 Base body
5 Clamping region
6 Holding region
7 Recess
8 Insert
9 Connecting device
10 Screw
11 Nut
12 Through-borehole
13 Screw head
14 Guide component
15 Attachment device
16 Screw
17 Nut
18a, 18b Sidewalls
19 Screw
20 Nut
21 End region of the insert
22 Through-borehole of the insert
23 Through-borehole of the holding region
24 Gap
25 Flange region
26 Borehole
27 Bottom clamping surface
28 Top clamping surface
29 Connection surface
30 Connecting rod
31 Attachment device
32 Guide component

What is claimed is:

1. A clamp-type holder element comprising:
a base body comprising a mouth-shaped clamping region having a first clamping surface and a second clamping surface interconnected by a connection surface at a first end and a holding region adapted for attachment of a component at a second end,
wherein a through-borehole is formed in the base body underneath the clamping region, which through-borehole extends towards the holding region of the base body, and a plane in which the first clamping surface is situated forms an inclined angle with the longitudinal axis of the through-borehole, the first clamping surface being spaced apart from the through-borehole at a first distance and the second clamping surface being spaced apart from the through-borehole at a second distance, the second distance being greater than the first distance;

wherein the longitudinal axis of the through-borehole runs such that a distance between the longitudinal axis and the plane of the first clamping surface increases in a direction from the clamping region to the holding region.

2. The clamp-type holder element of claim 1, wherein the longitudinal axis of the through-borehole extends at a predefined angle at an incline in relation to the clamping region.

3. The clamp-type holder element of claim 1, further comprising:
an insert to which a component can be attached,
wherein the holding region comprises a recess being configured for accommodating the insert.

4. The clamp-type holder element of claim 3, wherein the recess is conical in shape so as to accommodate a corresponding conical end of the insert.

5. The clamp-type holder element of claim 3, wherein the insert is press-fitted in the recess.

6. The clamp-type holder element of claim 3, wherein the insert is configured to be screwed to the holding region of the base body.

7. The clamp-type holder element of claim 3, wherein the insert essentially extends along the longitudinal axis of the recess, perpendicular to the clamping region.

8. A clamp-type holder system comprising:
a first clamp-type holder element comprising:
a base body comprising a mouth-shaped clamping region having a first clamping surface and a second clamping surface interconnected by a connection surface at a first end and a holding region adapted for attachment of a component at a second end,
wherein a through-borehole is formed in the base body underneath the clamping region, which through-borehole extends towards the holding region of the base body, and a plane in which the first clamping surface is situated forms an inclined angle with the longitudinal axis of the through-borehole, the first clamping surface being spaced apart from the through-borehole at a first distance and the second clamping surface being spaced apart from the through-borehole at a second distance, the second distance being greater than the first distance;
a second clamp-type holder element comprising:
a base body comprising a mouth-shaped clamping region having a first clamping surface and a second clamping surface interconnected by a connection surface at a first end and a holding region adapted for attachment of a component at a second end,
wherein a through-borehole is formed in the base body underneath the clamping region, which through-borehole extends towards the holding region of the base body, and a plane in which the first clamping surface is situated forms an inclined angle with the longitudinal axis of the through-borehole, the first clamping surface being spaced apart from the through-borehole at a first distance and the second clamping surface being spaced apart from the through-borehole at a second distance, the second distance being greater than the first distance; and
a connecting device;
wherein the first clamp-type holder element and the second clamp-type holder element are configured to be connected by way of the connecting device extending through the respective through-boreholes in the first clamp-type holder element and the second clamp-type holder element when the clamp-type holder elements are clamped to opposite sides of a profile beam;
wherein the longitudinal axis of the through-borehole runs such that a distance between the longitudinal axis and the plane of the first clamping surface increases in a direction from the clamping region to the holding region.

9. The clamp-type holder system of claim 8, wherein the connecting device comprises a screw and a nut in order to firmly clamp the clamp-type holder elements to the profile beam by rotating the screw and the nut relative to each other.

10. The clamp-type holder system of claim 8, wherein when the clamp-type elements are clamped to the profile beam the connecting device acts as a spring element which in the regions of the through-boreholes of the clamp-type holder elements is elastically bent from the base body towards the outside and which generates a spring force for clamping the clamp-type holder elements to the profile beam (3).

* * * * *

UNITED STATES PATENT AND TRADEMARK OFFICE
CERTIFICATE OF CORRECTION

Page 1 of 1

| | |
|---|---|
| PATENT NO. | : 7,726,614 B2 |
| APPLICATION NO. | : 11/885829 |
| DATED | : June 1, 2010 |
| INVENTOR(S) | : Redecker |

It is certified that error appears in the above-identified patent and that said Letters Patent is hereby corrected as shown below:

Col. 1, line 34, "an clamp-type holder" should read --a clamp-type holder--

Col. 2, line 57, "a exemplary embodiment" should read --an exemplary embodiment--

Col. 2, line 60, "a exemplary embodiment" should read --an exemplary embodiment--

Col. 3, line 11, insert --,-- after --of the figures--

Col. 3, line 36, delete "," after --element 2--

Col. 4, line 36, "comprises" should read --compromise--

Col. 6, line 18, delete "," after --respectively--

Col. 8, line 45, delete "(3)" after --profile beam--

Signed and Sealed this
Twenty-first Day of June, 2011

David J. Kappos
*Director of the United States Patent and Trademark Office*